3,401,139
FLEXIBLE PHENOLIC BAKING RESINS PREPARED BY REACTING A POLYHYDRIC PHENOL ETHER, PHENOL AND AN ORGANIC SOLUTION OF FORMALDEHYDE
William I. Wertz, East Brunswick, and Stanley H. Richardson, Millington, N.J., assignors to Union Carbide Corporation, a corporation of New York
No Drawing. Continuation of application Ser. No. 246,665, Dec. 24, 1962. This application Aug. 17, 1967, Ser. No. 661,463
14 Claims. (Cl. 260—33.4)

This application is a continuation of copending case Ser. No. 246,665, filed Dec. 24, 1962, now abandoned.

This invention relates to curable phenolic compositions and resins prepared therefrom; more particularly it relates to curable phenolic resins of formaldehyde, phenol and a polyhydric compound and resins prepared therefrom.

Baked coatings of phenolic resins have heretofore found extensive employment in the metal container art as a protective coating or film between the metal container and contents therein. This protective coating prevents contamination and chemical reaction between the metal container and its contents. In general, the protective coatings employed heretofore have been the condensation product of phenol reacted with a molar excess of formaldehyde. These phenolic resins are commonly referred to in the art as standard phenolic resins. Unfortunately baked coatings of standard phenolic resins possess poor impact resistance and flexibility. Thus minor jars, dents or internal scratches upon the metal container will destroy the protective nature of the coating.

Many attempts have been made to modify standard phenolic resins in order to increase their flexibility. Although the art has achieved moderate success in increasing the flexibility of these resins it has been able to do so only at the sacrifice of other essential properties such as hardness, chemical and solvent resistance. Therefore, modified forms of standard phenolic resins known heretofore have not been considered to be a proper substitute for standard phenolic resins.

According to the present invention there is provided a composition capable of forming a baked coating consisting essentially of the reaction product of (a) A polyhydric compound of the formula:

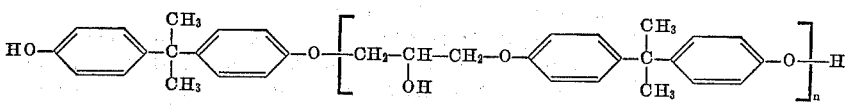

wherein $n$ is an integer from 1 to 2 inclusive, (b) Phenol wherein the amount of phenol ranges from 10 to 40 percent by weight of the polyhydric compound and (c) A solution of formaldehyde in an organic solvent, said organic solution being volatile at the curing temperature of the resin, said solution having a formaldehyde content of at least one mole per mole of phenolic hydroxyl of components (a) and (b). Generally not more than about 3 moles of formaldehyde per mole of phenolic hydroxyl need be used to obtain the benefits of the invention, and a preferred range is 2 to 3 moles.

In the present invention there is employed a polyhydric compound of the above-mentioned formula as one of the necessary components. The polyhydric compounds employed herein may be obtained by reacting two moles 4,4'-dihydroxdiphenyldimethylmethane, i.e., bisphenol A, in the presence of an alkaline catalyst with either one mole of epichlorohydrin or one mole of the diglycidyl ether of bisphenol A. Advantageously to insure homogenous admixture and reaction with the other components it is desirable to dissolve the polyhydric component (a) in an organic solvent which is the same, as or is compatible and miscible with, the solvent system of component (c). Exemplary solvents include alkyl alcohols, ethyl, Cellosolve, methyl isobutyl ketone, diacetone alcohol, Cellosolve acetate and like organic solvents.

Another necessary component in preparing the composition herein disclosed is phenol. The amount of phenol ranges from 10 to 40 percent by weight of the total amount of polyhydric compound in the curable composition. Advantageously employable in the curable composition of the present invention are amounts of phenol ranging from about 20 percent to about 30 percent by weight of the total amount of polyhydric compound in the curable composition. Particularly preferred is a phenolic concentration in the reaction media of about 25 percent by weight based on the total weight of polyhydric compound.

The polyhydric compound and the phenol as reacted with a stoichimetric amout of formaldehyde, i.e., at least one mole of formaldehyde per mole of phenolic hydroxyl. The preferred molar concentration of formaldehyde in the reaction media is from about 2 moles to about 3 moles of formaldehyde per mole of phenolic hydroxyl. Advantageously, in order to insure complete reaction between formaldehyde and the other reactants, the formaldehyde is added to other reactants in the form of an organic solvent solution. Such solvents as ethyl Cellosolve, methyl isobutyl ketone, diacetone alcohol, Cellosolve acetate and lower alkyl alcohols are all sufficiently volatile at the curing temperature of the resin as to be useful in this invention, although other organic solvents having like volatilities and solvating power for formaldehyde can be employed. Preferably employable are alkyl alcohols having from 1 to 6 carbon atoms and wherein the formaldehyde concentration ranges from about 30 to about 60 percent by weight of formaldehyde.

The chemical reaction between the reactants in the present invention is accomplished by refluxing the reactants in a volatile organic solvent in the presence of a basic catalyst at temperatures ranging from about 176° F. to about 320° F. for a period of time sufficient to cause chemical reaction between the reactants.

Illustrative basic catalysts useful in preparing the composition herein disclosed include the tertiary and quaternary amines, the bases of alkali earth metals, alkali metals and ammonia. Exemplary catalysts are sodium hydroxide, potassium hydroxide, calcium hydroxide, barium hydroxide, ammonium hydroxide, tetraethylammonium hydroxide, tetramethylammonium hydroxide, hexamethylenetetramine, dimethyl aniline, triethylamine, triamylamine, triphenylamine, sodium amide and the like. Preferably employable as a catalyst herein are the tertiary and quaternary amines with hexamethylenetetramine being most preferred.

A catalytic amount of catalyst ranging from about one to about six percent by weight of the total reactants is generally sufficient to insure complete reaction of the reactants with a catalytic amount ranging from about 3 to about 4 percent by weight being the preferred range.

The period of time necessary to insure complete reaction between the reactants depends to a great extent upon the temperature employed. At a temperature of 215° F. a reaction period of 3 hours is sufficient however a reaction period of 7 hours is preferred. In general a reaction period ranging from about 1 to 12 hours is employable in preparing the composition herein disclosed.

The addition of an acid to the reaction product of the polyhydric compound, phenol and formaldehyde will provide a composition having a faster curing rate. Illustrative acids useful in accelerating the curing rate are phosphoric acid, hydrochloric acid, sulfuric acid, oxalic acid, citric acid, acetic acid and the like. The amount of acid useful in accelerating the curing rate ranges from about 0.5 weight percent to about 5 weight percent, i.e. weight percent based on the total weight of reactants and preferably ranging from about 1 weight percent to about 2 weight percent.

The curable composition provided herein may be readily cured by employing a temperature of at least 325° F. for a period of time sufficient to produce an insoluble coating. Advantageously temperatures ranging from about 375° F. to about 450° F. are employed in curing the composition with temperatures ranging from 400° F. to 425° F. being preferred.

The compositions provided herein can readily be applied to a metallic surface and baked into the form of a smooth continuous film free from "eyes," "craters" and other film irregularities with excellent hardness and adhesion to the metallic surface. Baked films of the composition provided herein exhibit much greater flexibility and impact resistance than films of standard phenolic resins. This improved flexibility and impact resistance is accompanied by excellent chemical and solvent resistance.

Example 1

To a three necked flask having a three liter capacity and equipped with a reflux column, agitator, and a thermometer there was charged 259 grams of the diglycidyl ether of bisphenol A having an epoxide equivalent ranging from 185 to 200 and an average molecular weight ranging from about 350 to 400, 301 grams of bisphenol A and 1.0 gram of lithium naphthenate solution containing 1.4% lithium by weight. The reactants were then heated to 400° F. whereupon the heating was discontinued and an exothermic reaction between the reactants was observed. The reaction media was cooled and maintained at 445° F. After an hour the reactants were further cooled to 400° F. and 84 grams of methyl isobutyl ketone was slowly added to the reaction mixture. The reaction mixture was allowed to cool to 300° F. and 84 grams of butanol was added. The reaction mixture containing the dissolved polyhydric compound was then cooled to 200° F. and there was added thereto 534 grams of a formaldehyde-butanol solution containing 40 percent by weight of formaldehyde, 32 grams of hexamethylenetetramine and 140 grams of phenol. The reaction mixture containing the phenol, formaldehyde and polyhydric compound was then refluxed at 200° F. After 7 hours of refluxing, 16.7 grams of 85% phosphoric acid was added and refluxing was continued for an additional 2 hours at 205° F. The reaction product was then diluted with 473 grams of methyl ethyl ketone.

The reaction product was tested and found to have a viscosity of 165 cps., (G, Gardner-Holdt) and a total solid content of 50%.

Several cold rolled steel panels, having a 0.020 inch thickness, 3 inch width and a length of 6 inches were dipped into the reaction product and then cured in a baking oven maintained at 400° F. for 30 minutes. The film thickness on the respective steel panels was found to be 0.5 mil ±.03 mil. The film on the respective steel panels was in the form of a smooth continuous film free from visual "eyes," "craters" and other film irregularities commonly known to one skilled in the art. The film could not be marred or removed from the steel panel by the application of a firm pressure upon the film by a fingernail edge and subsequent movement thereof along the film surface with a constant pressure. Upon bending one of the steel panel members around a ⅛ inch mandrel no visual fractures or separation of the film from the steel panel was observed, thus indicating superior flexibility over standard resins which fail to pass this test.

In order to test the solvent resistance properties of the film, three steel panels were immersed in acetone and maintained at ambient conditions, i.e., about 77° F., and tested at the end of each consecutive day by the application of a firm pressure upon the edge of the fingernail and movement thereof along the film surface. All films remained intact on the steel panels after 8 days of testing in the aforesaid manner. This is unexpectedly greater than the baked reaction product of formaldehyde and the polyhydric compound which fails the above-mentioned fingernail test after being immersed in acetone for 15 minutes.

Employing the same fingernail test as used in testing solvent resistance in acetone, three coated steel panels were immersed in boiling water and tested at the end of each hour of immersion. The so coated steel panel members were able to withstand the fingernail test after 8 hours of immersion in the boiling water. This was superior to formaldehyde-polyhydric condensates which were unable to pass the fingernail test after two hours.

In order to establish the alkali resistance of the cured film of the reaction product of the present example, three steel panels coated with the cured film were placed in an aqueous solution of 10 percent by weight sodium hydroxide maintained at ambient conditions. Visual observance of the coated steel panels indicated that 8 hours of immersion in sodium hydroxide failed to disrupt the coating (e.g., no blush spots).

Impact resistance of the cured film was tested by the Gardner impact test. The film on the steel panel was capable of passing an impact resistance of 80 inch pounds. This is considerably greater than cured standard phenolic resin films which fail at 4 to 10 inch pounds.

For purposes of comparison, the product of this example was compared with similar resins using a polyhydric compound and formaldehyde but excluding the phenol, and with a commercial phenol-formaldehyde condensation resin. Table A summarizes the method of preparation. Table C illustrates comparatively the physical properties secured thereby. Table B illustrates comparatively the physical properties of Example I and a standard phenolic resin.

TABLE A

| Description | Resin type — A modified phenolic resin (grams) | Resin type — A standard phenolic resin (parts by weight) | Example I (grams) |
|---|---|---|---|
| Diglycidyl ether of bisphenol, a epoxide equivalent 185–200, average molecular weight 350–500 | 256 | | 259 |
| Bisphenol A | 304 | | 301 |
| Lithium naphthenate catalyst for bis-A and diglycidyl ether of bis-A | 1.0 | | 1.0 |
| Methyl isobutyl ketone | 84 | 67 | 84 |
| Solution of 40% by weight of formaldehyde dissolved in butanol | 200 | | 534 |
| Butanol | 84 | | 84 |
| Hexamethylenetetramine | 23 | 3 | 32 |
| Methyl ethyl ketone | 294 | | 473 |
| 37% by weight of formaldehyde in aqueous solution | | 75 | |
| Cresol | | 10 | |
| 2-ethoxyethanol (ethyl Cellosolve) | | 67 | |
| Phenol | | 90 | 140 |
| Reaction conditions | (¹) | (²) | (³) |
| 85% phosphoric acid | | | 16.7 |

¹ Procedure and conditions same as employed in Example 1 for the respective reactants.
² Standard procedure for standard phenolic resins.
³ Same as employed in write-up of Example 1.

TABLE B

| Description | Coated steel panels employing resin in Example I | Coated standard phenolic resin |
|---|---|---|
| Film thickness | 0.53 mil | 0.51 mil |
| Baking schedule | 20 min. at 400° F. | 30 min. at 400° F. |
| ⅛″ mandrel test | Pass | Fail |
| 10% NaOH test | Pass 8 hours | Fails after 15 min. |
| Impact resistance | Pass 80 inch-pounds | Fails 10 inch-pounds |

TABLE C

| Description | Coated steel panels, modified phenolic resin | Coated steel panels, standard phenolic resin | Example I |
|---|---|---|---|
| Film thickness | 0.50 mil | 0.50 mil | 0.50 mil |
| Baking schedule | 30 min. at 400° F. | 30 min. at 400° F. | 30 min. at 400° F. |
| Acetone immersion test | Fails after 15 min | | 8 days |
| Boiling water test | Pass 1 hour, fail 2 hrs. | Pass 8 hours | Pass 8 hrs. |

Shelf-life of the reaction product of phenol, formaldehyde and the polyhydric compound of Example 1 was superior to that of the modified phenol resin. The reaction product of the phenol, formaldehyde and polyhydric compound had a 50% non-volatile solid content and an initial viscosity 165 cps. This viscosity increased to 885 cps. in 9 months. A much greater increase was observed with the modified form which had a 50% non-volatile solid content. This modified form increased from an initial viscosity of 470 cps. to 9850 cps. in four months.

We claim:

1. A curable phenolic composition consisting essentially of the reaction product of
   (a) a polyhydric compound of the formula

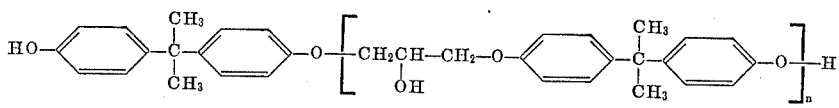

wherein *n* is an integer from 1 to 2 inclusive,
   (b) phenol wherein the amount of phenol ranges from 10 to 40 percent by weight of the polyhydric compound and
   (c) a solution of formaldehyde in an organic solvent, said solvent being volatile at the curing temperatures of the composition, having a formaldehyde content of at least one mole per mole of phenolic hydroxyl of components (a) and (b) and said reaction being carried out at temperatures ranging from about 176° F. to about 320° F. in the presence of an alkaline catalyst.

2. The cured composition according to claim 1 obtained by heating said composition to a temperature of at least 325° F.

3. The composition according to claim 1 wherein the amount of phenol ranges from about 20 to about 30 percent by weight of the polyhydric compound and the solvent is an alkyl alcohol having from 1 to 6 carbon atoms inclusive.

4. The composition according to claim 1 wherein the formaldehyde content ranges from about 2 to about 3 moles per mole of phenolic hydroxyl of components (a) and (b).

5. The cured composition according to claim 3 obtained by heating said composition to a temperature of at least 325° F.

6. The cured composition according to claim 4 obtained by heating said composition to a temperature of at least 325° F.

7. A curable phenolic composition consisting essentially of the reaction product of
   (a) a polyhydric compound of the formula

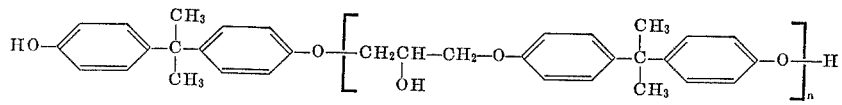

wherein *n* is an integer from 1 to 2 inclusive,
   (b) phenol wherein the amount of phenol ranges from 10 to 40 percent by weight of the polyhydric compound and
   (c) a solution of formaldehyde in an organic solvent, said solvent being volatile at the curing temperatures of the composition, having a formaldehyde content of at least one mole per mole of phenolic hydroxyl of components (a) and (b), the reaction product of (a), (b) and (c) having admixed with it from 0.5 percent by weight to about 5 percent by weight of phosphoric acid, said reaction being carried out at temperatures ranging from about 176° F. to about 320° F. in the presence of an alkaline catalyst.

8. The cured composition according to claim 7 obtained by heating said composition to a temperature of at least 325° F.

9. A curable phenolic composition consisting essentially of the product obtained by reacting together the following:
(a) a polyhydric compound of the formula

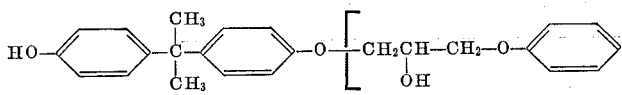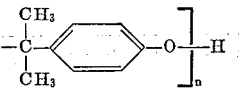

wherein $n$ is an integer from 1 to 2 inclusive,
(b) phenol wherein the amount of phenol ranges from 10 to 40 percent by weight of the polyhydric compound and
(c) a solution of formaldehyde in an organic solvent, said solvent being volatile at the curing temperature of the composition, having a formaldehyde content of at least one mole per mole of phenolic hydroxyl of components (a) and (b); said reaction being carried out in admixture with a catalytic amount of an alkaline catalyst at temperatures ranging from about 176° F. to about 320° F.

10. The cured composition according to claim 9 obtained by heating said composition to a temperature of at least 325° F.

11. The composition according to claim 9 wherein the formaldehyde content ranges from about 2 to about 3 moles per mole of phenolic hydroxyl of components (a) and (b) and the amount of phenol ranges from about 20 to about 30 percent by weight of the polyhydric compound.

12. The cured composition according to claim 11 obtained by heating said composition to a temperature of at least 325° F.

13. The composition according to claim 11 wherein the organic solvent is an alkyl alcohol having from 1 to 5 carbon atoms inclusive, the amount of phenol is about 25 percent by weight of the polyhydric compound; said reaction product having from about 1 percent by weight to about 5 percent by weight of phosphoric acid in admixture with the reaction product.

14. The cured composition according to claim 13 obtained by heating said composition to a temperature of at least 325° F.

References Cited

UNITED STATES PATENTS 3,056,762  10/1962  Tringali.

FOREIGN PATENTS 364,042  6/1922  Germany.
639,221  6/1950  Great Britain.

WILLIAM H. SHORT, *Primary Examiner.*

H. SCHAIN, *Assistant Examiner.*